(12) United States Patent
Goheer et al.

(10) Patent No.: US 7,930,494 B1
(45) Date of Patent: *Apr. 19, 2011

(54) STORAGE AREA NETWORK (SAN) SWITCH MULTI-PASS ERASE OF DATA ON TARGET DEVICES

(75) Inventors: Muhammad Asim Goheer, Milpitas, CA (US); Maurilio Cometto, Palo Alto, CA (US); Prashant Billore, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,419

(22) Filed: Mar. 23, 2010

Related U.S. Application Data

(63) Continuation of application No. 11/852,945, filed on Sep. 10, 2007, now Pat. No. 7,707,371.

(51) Int. Cl.
*G06F 12/00* (2006.01)
(52) U.S. Cl. ............ 711/159; 711/4; 711/111; 711/112; 711/114; 711/150; 711/203; 360/57; 360/118; 365/185.3
(58) Field of Classification Search .................. 711/159, 711/4, 111, 112, 114, 150, 203; 360/118; 365/185.3
See application file for complete search history.

(56) References Cited

U.S. PATENT DOCUMENTS

| | | | |
|---|---|---|---|
| 6,522,585 | B2 | 2/2003 | Pasternak |
| 6,618,546 | B2 | 9/2003 | Ichioka et al. |
| 6,892,264 | B2 | 5/2005 | Lamb |
| 7,467,253 | B2 | 12/2008 | Yero |
| 2001/0030824 | A1 | 10/2001 | Dixon |
| 2002/0019908 | A1 | 2/2002 | Reuter et al. |
| 2003/0167327 | A1 | 9/2003 | Baldwin et al. |
| 2010/0138619 | A1* | 6/2010 | Benavides ............. 711/159 |

OTHER PUBLICATIONS

Gutmann, Peter, "Secure Deletion of Data from Magnetic and Solid-State Memory," Sixth USENIX Security Symposium, Jan. 10, 2003, http://www.usenix.org/publications/library/proceedings/sec96/full... Jan. 20, 2009, pp. 1-18.

Goheer, et al., U.S. Patent Application titled "Storage Area Network (San) Switch Multi-Pass Erase Of Data On Target Devices," filed Sep. 10, 2007, U.S. Appl. No. 11/852,945.

* cited by examiner

*Primary Examiner* — Stephen C Elmore
(74) *Attorney, Agent, or Firm* — Weaver Austin Villeneuve and Sampson LLP

(57) ABSTRACT

Techniques are provided for performing multi-pass erase. An erase command is received at a storage area network (SAN) switch in a storage area network. The erase command is associated with a block of data on a target device. A virtual initiator is determined for performing the erase command on the block of data. Multiple bit patterns are generated using a multi-pass erase algorithm. The multiple bit patterns are generated for writing over the block of data on the target device. Repeated writes are performed over the block of data using the bit patterns. The block of data is repeatedly overwritten to remove remanence of the block of data on the target device.

19 Claims, 6 Drawing Sheets

STORAGE AREA NETWORK (SAN) SWITCH MULTI-PASS ERASE OF DATA ON TARGET DEVICES

CROSS-REFERENCE TO RELATED APPLICATION

This application is a continuation of and claims priority to application Ser. No. 11/852,945, now U.S. Pat. No. 7,707, 371, filed Sep. 10, 2007 and titled "STORAGE AREA NETWORK (SAN) SWITCH MULTI-PASS ERASE OF DATA ON TARGET DEVICES," all of which is incorporated herein by this reference for all purposes.

TECHNICAL FIELD

The present disclosure relates to a switch performing a multi-pass erase of data on target devices associated with a storage area network (SAN).

DESCRIPTION OF RELATED ART

In many instances, a user may want to delete data maintained on storage area network devices such as storage arrays. For example, a user may be replacing old storage arrays, may be moving and consolidating confidential data onto other arrays, or may be physically transferring control of a storage array to another user. A simple erase is often insufficient because of data remanence. Storage arrays often retain residual representations of data even after a user deletes the data. The physical and magnetic characteristics allow individuals to reconstruct the data using physical and magnetic characteristics remaining on the storage arrays.

An individual can use magnetic force microscopy or scanning tunneling microscopy to analyze characteristics of data remanence to reconstruct overwritten data. Even encrypting the data does not solve the problem. After encryption, the encrypted data is moved to a new array leaving the plaintext data behind on existing array. In other cases, the original data is simply overwritten by encrypted data. Plaintext data is still vulnerable and can remain under the encrypted layers of data.

Conventional mechanisms for performing data deletions have significant limitations. Consequently, it is desirable to provide improved methods and apparatus performing data deletions in storage area network (SAN) environments.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
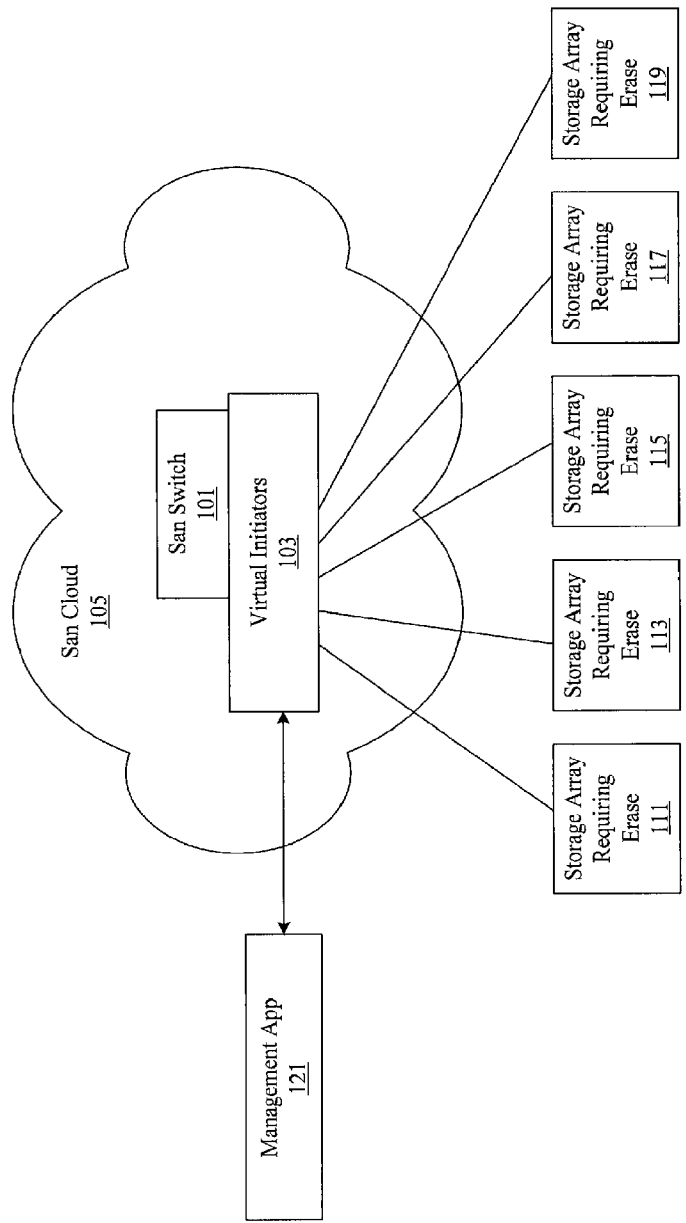
FIG. 1 illustrates a particular example of a storage area network having storage arrays.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular applications and switches. However, it should be noted that the techniques of the present invention apply to a variety of different applications and switches. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques are provided for performing multi-pass erase. An erase command is received at a storage area network (SAN) switch in a storage area network. The erase command is associated with a block of data on a target device. A virtual initiator is determined for performing the erase command on the block of data. Multiple bit patterns are generated using a multi-pass erase algorithm. The multiple bit patterns are generated for writing over the block of data on the target device. Repeated writes are performed over the block of data using the bit patterns. The block of data is repeatedly overwritten to remove remanence of the block of data on the target device.

Example Embodiments

A variety of delete type operations are available in processing systems. At a rudimentary level, the delete function in most operating systems simply removes the pointer to a file without deleting the actual file. However, a variety of software tools can be used to recover the file at this point. An actual delete of the data typically requires overwriting the old data. For example, when a new application writes over a data block. However, even when the actual data is overwritten, tools such as magnetic force microscopy or scanning tunneling microscopy make it possible to retrieve overwritten layers of data. The retrieval is possible primarily because of data remanence, or the residual representation of data that has been overwritten.

Consequently, many conventional mechanisms for erasing data from storage devices are limited. Some mechanisms use data encryption schemes to allow for more complete data removal. Data is maintained on a storage device in encrypted form. In some instances, data is encrypted as it is written to the storage device. A separate device such as a portable drive holds an encryption key. To read or modify the data, a user provides the encryption key. To delete the data, a user can simply delete the encryption key or even discard the portable device holding the encryption key. Assuming that the encryption algorithm is sufficiently strong, discarding the encryption key is equivalent to making the data completely inaccessible and consequently irretrievable.

However, even if data encryption is used as a mechanism for providing more complete data removal, some plaintext data may remain on physical media. In some instances, a storage array may hold plaintext data before it later holds encrypted data. Data remanence still allows retrieval of old plaintext data. In other instances, some data may remain unencrypted for a variety of reasons. Furthermore, encryption algorithms deemed secure today may no longer be secure with code breaking schemes running on the computers of tomorrow. Furthermore, strong encryption schemes consume a large amount of processing resources. Consequently, encryption based erase mechanisms are limited.

Some mechanisms are restricted to use in a personal computer (PC) environment and erase data only on physically attached hard disks. These mechanisms can not be used on storage arrays connected to storage area networks. Still other mechanisms are based on manipulation of the physical disks. For example, an administrator can physically destroy storage arrays through incineration, melting, chemical corrosion, etc. An administrator can also perform degaussing on storage devices. Degaussing leaves the magnetic domains on the storage media in random patterns with no preference to orientation. An administrator can also invite vendor personnel onto the premises to implement vendor specific storage array based solutions. However, all of these mechanisms are physically intrusive and expensive.

Consequently, various particular embodiments provide mechanisms for implementing multi-pass erase mechanisms at a storage area network switch in a host agnostic and target agnostic manner. Particular embodiments require no vendor specific solutions and apply to a variety of devices from different vendors. Multi-pass erase can run while target devices such as storage arrays are offline or online. Any mechanism for writing patterns of bits over a particular block of data multiple times to remove data remanence is referred to herein as multi-pass erase. Multi-pass erase can also run in association with reads and writes in a manner transparent to a host. Hosts are free to perform other services, as the intelligence used for multi-pass erase is implemented in a storage area network. Virtual initiators associated with a storage area network can perform multi-pass erases of many storage arrays simultaneously. Existing data on a given target device is rewritten in a way that makes reconstructing that data virtually impossible. In other words, the mechanisms leave little or no data remanence. Algorithms specify pattern sequences that are repeatedly written on target devices.

According to particular embodiments, virtual initiators perform the repeated writes. In particular embodiments, the virtual initiators run on line cards included in a particular storage area network switch. Hosts can continue issuing transactions while multi-pass erase transactions are occurring. Multi-pass erases implemented at a storage area network switch allow high speed and low cost deletions of data while providing ease of execution and platform independence.

FIG. 1 illustrates a particular example of storage area network (SAN) based data erase. According to particular embodiments, storage area network (SAN) based delete can be implemented while a SAN and associated target devices are offline. A SAN cloud includes multiple SAN switches including SAN switch 101. According to particular embodiments, the SAN switch 101 is associated with virtual initiators 103. That is, the storage arrays 111, 113, 115, 117, and 119 interact with the virtual initiators 103 as though they are actual initiators or hosts. In particular embodiments, a management application 121 is connected to the SAN switch 101 and initiates multi-pass erase operations. According to particular embodiments, a user can specify particular blocks, LUNs, target ports, address ranges, target enclosures, virtual initiators, etc. A user may also specify algorithms used for generating patterns for overwriting target data.

According to particular embodiments, algorithms take into account the encoding scheme on the target device. This erases data bits as well as encoded bits such as parity and checksum bits from the target. In particular embodiments, every target follows a certain encoding scheme while writing data on the physical media e.g. run-length limited (RLL) encoding. On a disk, a bit is written by a polarity transition or the lack thereof. Writing lots of consecutive zeros or ones can create problems as a clock signal can go out of sync. According to particular embodiments, to avoid this problem, additional data bits are written to ensure periodic transitions.

In particular embodiments, multi-pass erase deletes not only data bits but extra encoding bits on the target. The pattern sequences are implemented in a manner to account for the extra encoding bits. Many multi-pass erase algorithms are specific to particular encoding schemes. According to particular embodiments, one algorithm overwrites addressable locations with a character, its complement, a random character, and then proceeds to perform a verification. A variety of algorithms can be used, including the Gutmann Method. A variety of algorithms can be combined with cryptographically strong random number generation scheme to further ensure complete deletion of data.

Furthermore, a system bypasses caching mechanisms to write patterns directly on the target media. According to particular embodiments, a "Force Unit Access" bit is set during Small Computer System Interface (SCSI) writes. Force Unit Access (FUA) tells the target to immediately send the data to the media surface and to not buffer it through a cache. In addition, a user can disable caching by configuring the storage array in a particular manner. In another embodiment, in case the target cache cannot be bypassed, the erase process can perform enough writes to saturate the cache of the target to enforce a flush operation that writes the intended pattern on the physical media blocks.

Figure 2:
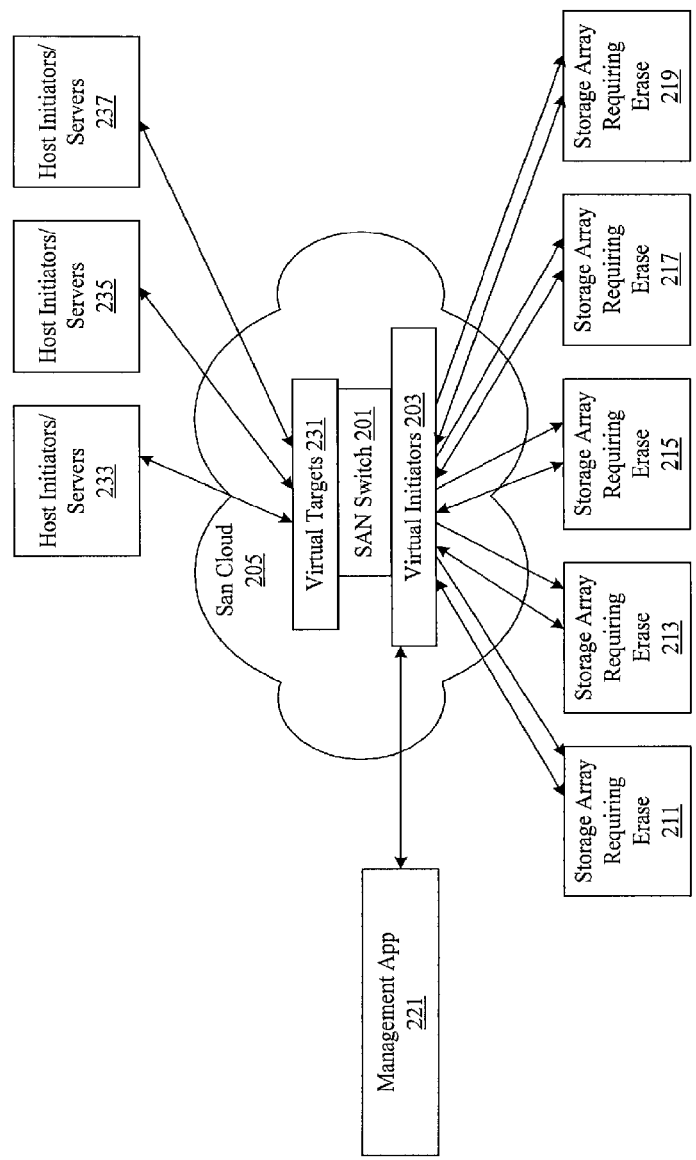
FIG. 2 illustrates a particular example of a storage area network having storage arrays and online hosts.

FIG. 2 illustrates a particular example of storage area network (SAN) based data erase. According to particular embodiments, storage area network (SAN) based delete can operate while a SAN and associated target devices are offline. A SAN cloud includes multiple SAN switches including SAN switch 201. According to particular embodiments, the SAN switch 201 is associated with virtual initiators 203. That is, the storage arrays 211, 213, 215, 217, and 219 interact with the virtual initiators 203 as though they are actual initiators or hosts. In particular embodiments, a management application 221 is connected to the SAN switch 201 and initiates multi-pass erase operations. According to particular embodiments, a user can specify particular blocks, LUNs, target ports, address ranges, target enclosures, virtual initiators, etc. A user may also specify algorithms used for generating patterns for overwriting target data.

According to particular embodiments, the SAN also includes virtual targets 231 connected to hosts 233, 235, and 237. According to particular embodiments, the virtual targets 231 are managed by SAN switch 201. The virtual targets 231 appear as actual targets to hosts 233, 235, and 237, as hosts 233, 235, and 237 can send read and write operations to virtual targets 231 as though the virtual targets 231 were actual targets. According to particular embodiments, SAN based data erase can operate while storage arrays remain online. In particular embodiments, a multi-pass erase may be performed dynamically after a data block is read. A SAN switch 201 may receive a read request and forward the read request to a storage array 211.

Upon receiving a response for storage array 211, the SAN switch 201 can perform a multi-pass erase of the data that has just been read. In other particular embodiments, a SAN switch 201 receives a write request and performs a multi-pass erase prior to executing the write request. This removes data remanence prior to writing new data. In yet another particular embodiment, data can be written to one LUN while a multi-pass erase is performed on another LUN. All of these implementations allow a storage array to remain available while deletions are taking place. This prevents disruption and improves overall data availability. According to particular embodiments, multi-pass erase operations can occur without host intervention as well. Because a virtual initiator can operate on many storage arrays simultaneously, multi-pass erase operations on one LUN can occur at the same time new data is being written on another LUN.

Figure 3:
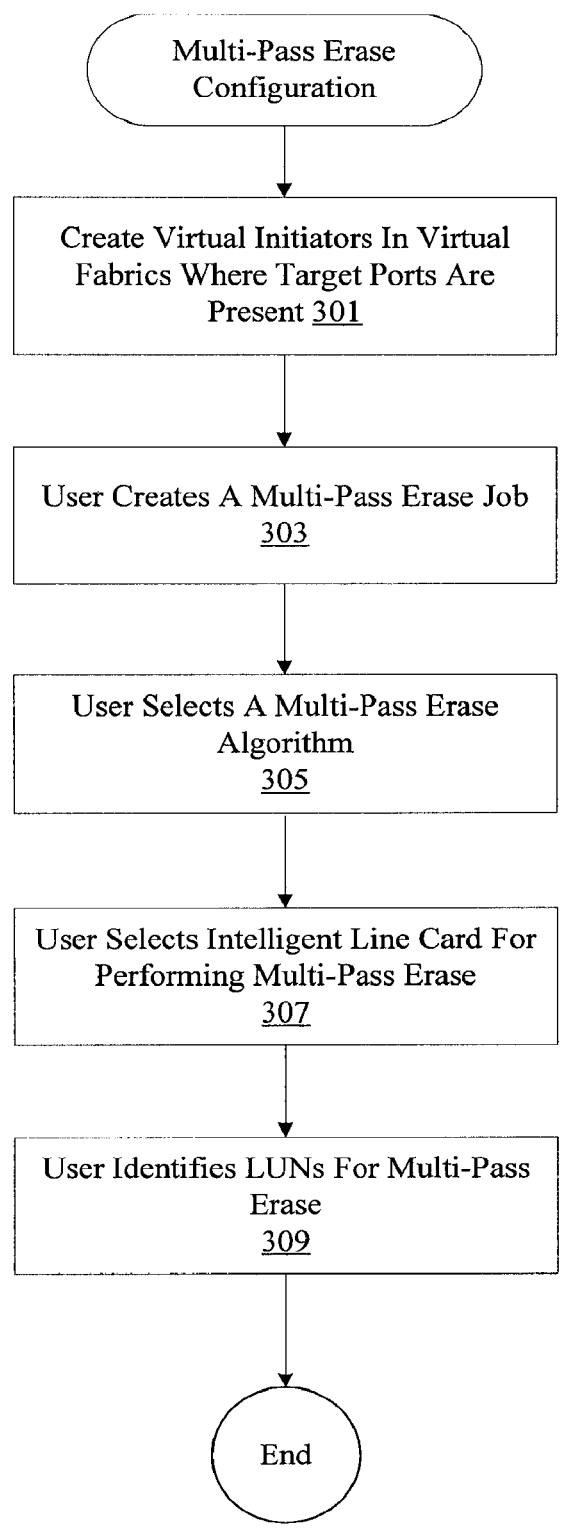
FIG. 3 illustrates a particular example of a technique for configuring multi-pass erase.

FIG. 3 illustrates one example of multi-pass erase configuration. According to particular embodiments, virtual initiators are created in Virtual Fabrics where target ports are present at 301. In particular embodiments, virtual initiators are associated with multiple storage arrays. At 303, a user creates a multi-pass erase job. In particular embodiments, the user creates the multi-pass erase job from a management application. At 305, a user selects a multi-pass erase algorithm. According to particular embodiments, multiple algorithms may be available along with a default algorithm. A user may also be able to create an algorithm or modify an existing algorithm. In particular embodiments, a user enters random number seeds for use in multi-pass erase. At 307, the user may also select a line card or an intelligent line card for performing multi-pass erases. According to particular embodiments, the intelligent line card implements a virtual initiator and resides on a SAN switch. The user may also activate or confirm a zoning configuration. At 309, a user identifies LUNs for multi-pass deletion.

Figure 4:
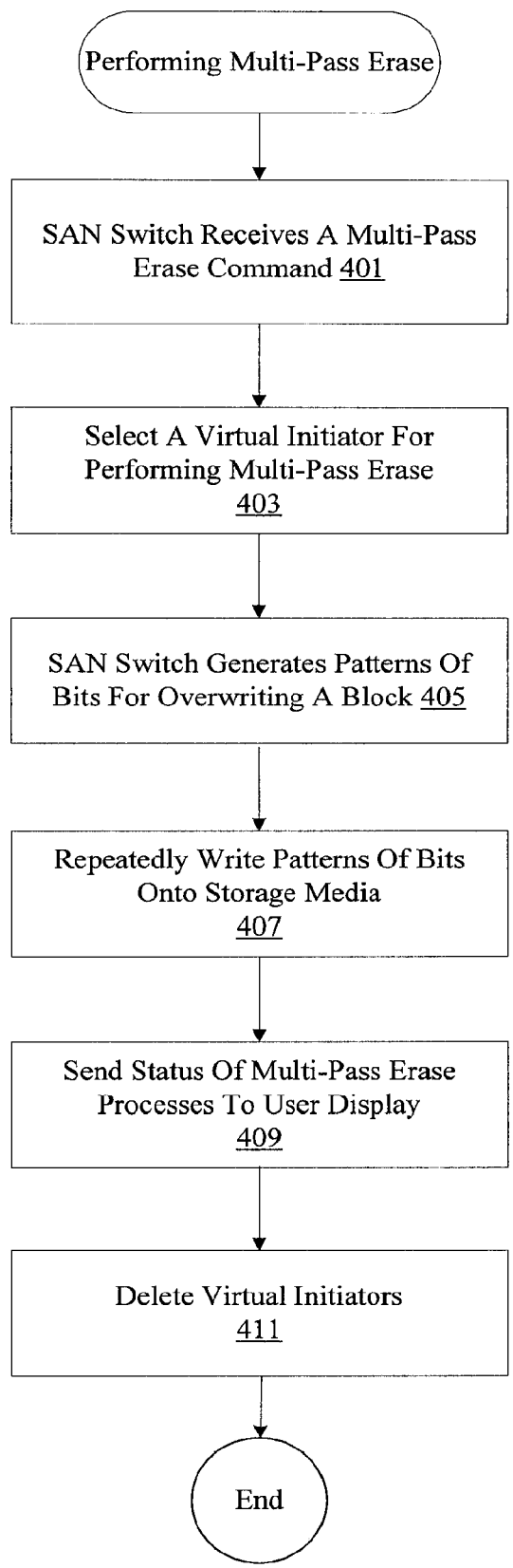
FIG. 4 illustrates a particular example of a technique for performing multi-pass erase.

According to particular embodiments, a user can configure multi-pass erase to operate in both storage array offline mode or storage array online mode. In particular embodiments, multi-pass erase operates during SAN online mode to allow continued network operation. FIG. 4 illustrates one example of a technique for performing multi-pass erase. At 401, a SAN switch having intelligent line cards receives a multi-pass erase command. At 403, a virtual initiator for performing multi-pass erase is selected. At 405, the SAN switch generates patterns of bits for overwriting a block. In particular embodiments, an intelligent line card associated with the SAN switch generates patterns of bits. According to particular embodiments, the patterns of bits are generated for overwriting a block, a LUN, an address range, etc.

At 407, the patterns of bits are written directly onto the storage media repeatedly. At 409, the status of multi-pass erase processes is sent to a user display. When multi-pass erase completes, virtual initiators can be deleted at 411.

Although multi-pass erase can operate while a storage array is offline, multi-pass erase can also operate while a storage array is online.

Figure 5:
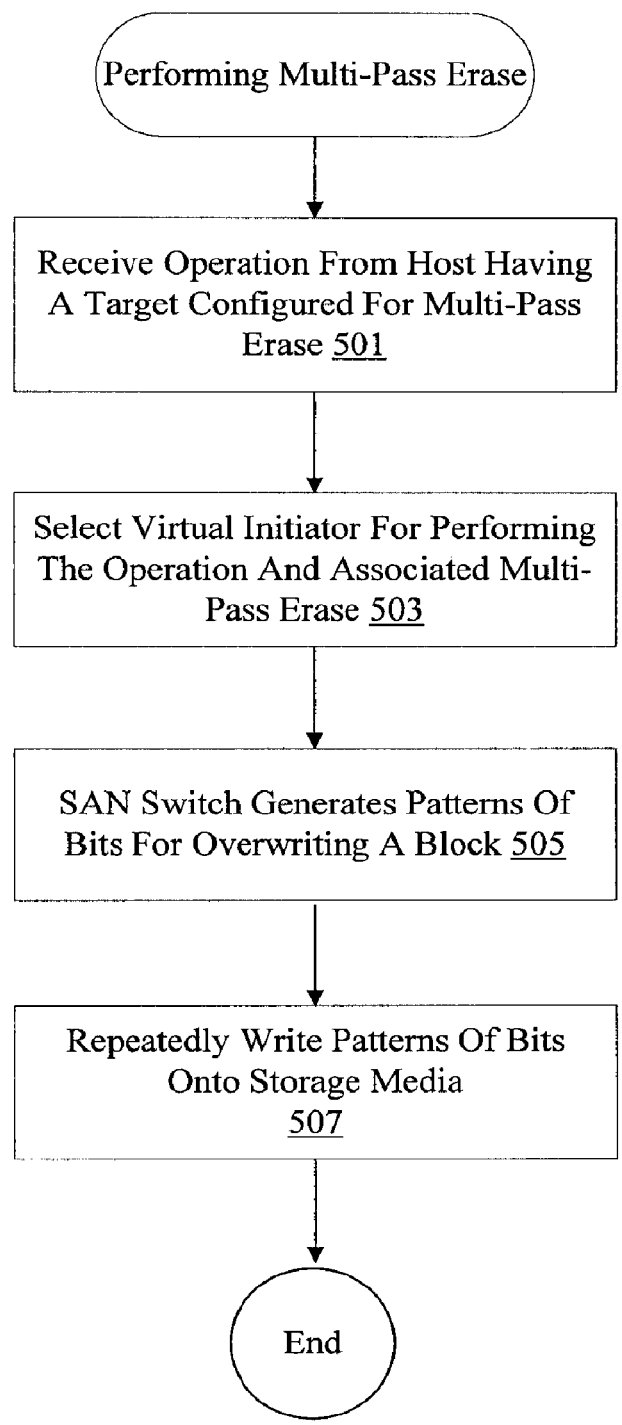
FIG. 5 illustrates a particular example of a technique for performing multi-pass erase.

FIG. 5 illustrates a technique performing data erase with a storage array online. At 501, a SAN switch having intelligent line cards receives an operation from a host having a target configured for multi-pass erase. The operation may be a read, write, move, etc. According to particular embodiments, an erase operation may occur after the read, before the write, or during the move. Furthermore, a host access mode allows deletion of particular blocks or LUNs while other blocks or LUNs are being accessed. For example, a virtual initiator may simultaneously delete a block on a first array while writing another block on a second array. At 503, a virtual initiator for performing the operation and associated multi-pass erase is selected. At 505, the SAN switch generates patterns of bits for overwriting a block.

In particular embodiments, an intelligent line card associated with the SAN switch generates patterns of bits. According to particular embodiments, the patterns of bits are generated for overwriting a block, a LUN, an address range, etc. At 507, the patterns of bits are written directly onto the storage media repeatedly.

Figure 6:
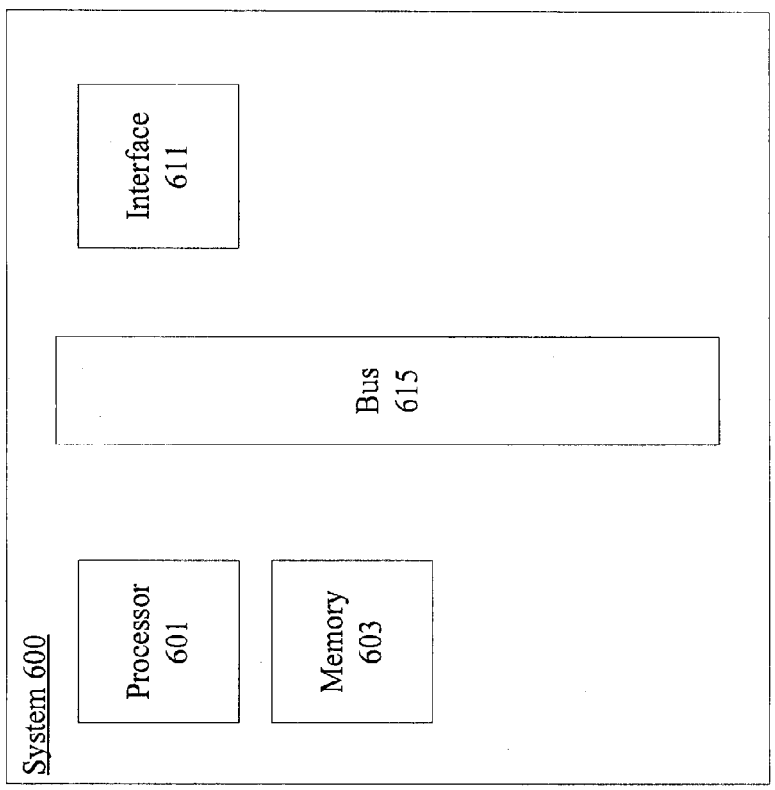
FIG. 6 illustrates a particular example of a storage area network switch.

A variety of devices and applications can implement particular examples of multi-pass erase. FIG. 6 illustrates one example of a device.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as pattern generation. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
receiving an erase command at a network device in a computer network, the erase command associated with a block of data on a target device;
generating a plurality of bit patterns for writing over the block of data on the target device;
at a virtual initiator associated with the network device, performing repeated writes over the block of data using the plurality of bit patterns, wherein the block of data is repeatedly overwritten to remove remanence of the block of data on the target device,
wherein the generating a plurality of bit patterns and performing repeated writes of the block of data is performed while hosts using the computer network continue to issue transactions.

2. The method of claim 1, wherein the virtual initiator is located on a line card of the network device.

3. The method of claim 1, wherein the target device interacts with the virtual initiator as though the virtual initiator was an actual initiator.

4. The method of claim 1, wherein the virtual initiator is further operable to bypass caching mechanisms to write the plurality of bit patterns directly on the target device.

5. The method of claim 1, wherein the virtual initiator is further operable to take into account an encoding scheme on the target device in generating the plurality of bit patterns.

6. The method of claim 1, further comprising receiving a random number seed or seeds for use in generating the plurality of bit patterns.

7. The method of claim 1, further comprising receiving a multi-pass algorithm for use in generating the plurality of bit patterns.

8. The method of claim 7, wherein the multi-pass algorithm is selected or defined by a user at run time.

9. The method of claim 1, wherein the virtual initiator is further operable to perform the erase command on another block of data on another target device simultaneously.

10. An apparatus, comprising:
an interface operable to receive an erase command in a computer network, the erase command associated with a block of data on a target device;
logic operable to generate a plurality of bit patterns for writing over the block of data on the target device, and perform, at a virtual initiator associated with the network device, repeated writes over the block of data using the plurality of bit patterns, wherein the block of data is repeatedly overwritten to remove remanence of the block of data on the target device, and
wherein the generating a plurality of bit patterns and performing repeated writes of the block of data is performed while hosts using the computer network continue to issue transactions.

11. The apparatus of claim 10, wherein the virtual initiator is located on a line card of the network device.

12. The apparatus of claim 10, wherein the target device interacts with the virtual initiator as though the virtual initiator was an actual initiator.

13. The apparatus of claim 10, wherein the logic is further operable to bypass caching mechanisms to write the plurality of bit patterns directly on the target device.

14. The apparatus of claim 10, wherein the logic is further operable to take into account an encoding scheme on the target device in generating the plurality of bit patterns.

15. The apparatus of claim 10, wherein the interface is further operable to receive a random number seed or seeds, and the logic is further operable to use the random number seed or seeds in generating the plurality of bit patterns.

16. The apparatus of claim 10, wherein the interface is further operable to receive a multi-pass algorithm, and the logic is further operable to use the multi-pass algorithm in generating the plurality of bit patterns.

17. The apparatus of claim 16, wherein the multi-pass algorithm is selected or defined by a user at run time.

18. The apparatus of claim 10, wherein the logic is further operable to perform the erase command on another block of data on another target device simultaneously.

19. A device, comprising:
means for receiving an erase command at a network device in a computer network, the erase command associated with a block of data on a target device;
means for generating a plurality of bit patterns for writing over the block of data on the target device;
means for, at a virtual initiator associated with the network device, performing repeated writes over the block of data using the plurality of bit patterns, wherein the block of data is repeatedly overwritten to remove remanence of the block of data on the target device,
wherein the generating a plurality of bit patterns and performing repeated writes of the block of data is performed while hosts using the computer network continue to issue transactions.

* * * * *